US012775723B2

(12) United States Patent
Kitagata

(10) Patent No.: US 12,775,723 B2
(45) Date of Patent: Oct. 27, 2026

(54) PRINTING SYSTEM AND METHOD OF CONTROLLING THE PRINTING SYSTEM

(71) Applicant: CANON KABUSHIKI KAISHA, Tokyo (JP)

(72) Inventor: Kei Kitagata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 18/736,751

(22) Filed: Jun. 7, 2024

(65) Prior Publication Data

US 2025/0005178 A1 Jan. 2, 2025

(30) Foreign Application Priority Data

Jun. 30, 2023 (JP) ................................ 2023-108520

(51) Int. Cl.

*G06F 21/60* (2013.01)
*G06F 3/12* (2006.01)
*G06F 21/36* (2013.01)

(52) U.S. Cl.

CPC .......... *G06F 21/608* (2013.01); *G06F 3/1222* (2013.01); *G06F 3/1238* (2013.01); *G06F 3/1287* (2013.01); *G06F 21/36* (2013.01)

(58) Field of Classification Search

None
See application file for complete search history.

(56) References Cited

U.S. PATENT DOCUMENTS

| | | | | |
|---|---|---|---|---|
| 11,379,160 | B2 | 7/2022 | Tomida | |
| 2006/0203255 | A1* | 9/2006 | Takaragi | H04N 1/00209 358/1.1 |
| 2018/0181352 | A1* | 6/2018 | Saito | G06F 3/1288 |
| 2020/0004479 | A1* | 1/2020 | Aoki | H04N 1/00477 |
| 2024/0056437 | A1* | 2/2024 | Martin | H04W 12/77 |
| 2024/0231720 | A1* | 7/2024 | Okutsu | G06F 3/1292 |

FOREIGN PATENT DOCUMENTS

| | | | |
|---|---|---|---|
| JP | 2020-001253 | A | 1/2020 |

* cited by examiner

*Primary Examiner* — Philip J Chea
*Assistant Examiner* — James Ross Hollister
(74) *Attorney, Agent, or Firm* — VENABLE LLP

(57) ABSTRACT

A printing system includes an information processing apparatus that requests a server for information for obtaining print data and requests the server for a verification identification number of the print data. An image forming apparatus reads a displayed print code, transmits information included in the print code and the verification identification number to the server, and transmits a data request to the server to obtain the print data and print the obtained print data. The server transmits the information for obtaining the print data, generates and transmits the verification identification number of the print data, verifies the verification identification number, and transmits the print data to the image forming apparatus. The print code includes a URL of the print data and identification data of the print data, and the verification identification number includes a password of a user that requests printing of the print data or a personal identification number of the user.

16 Claims, 14 Drawing Sheets

FIG. 10A

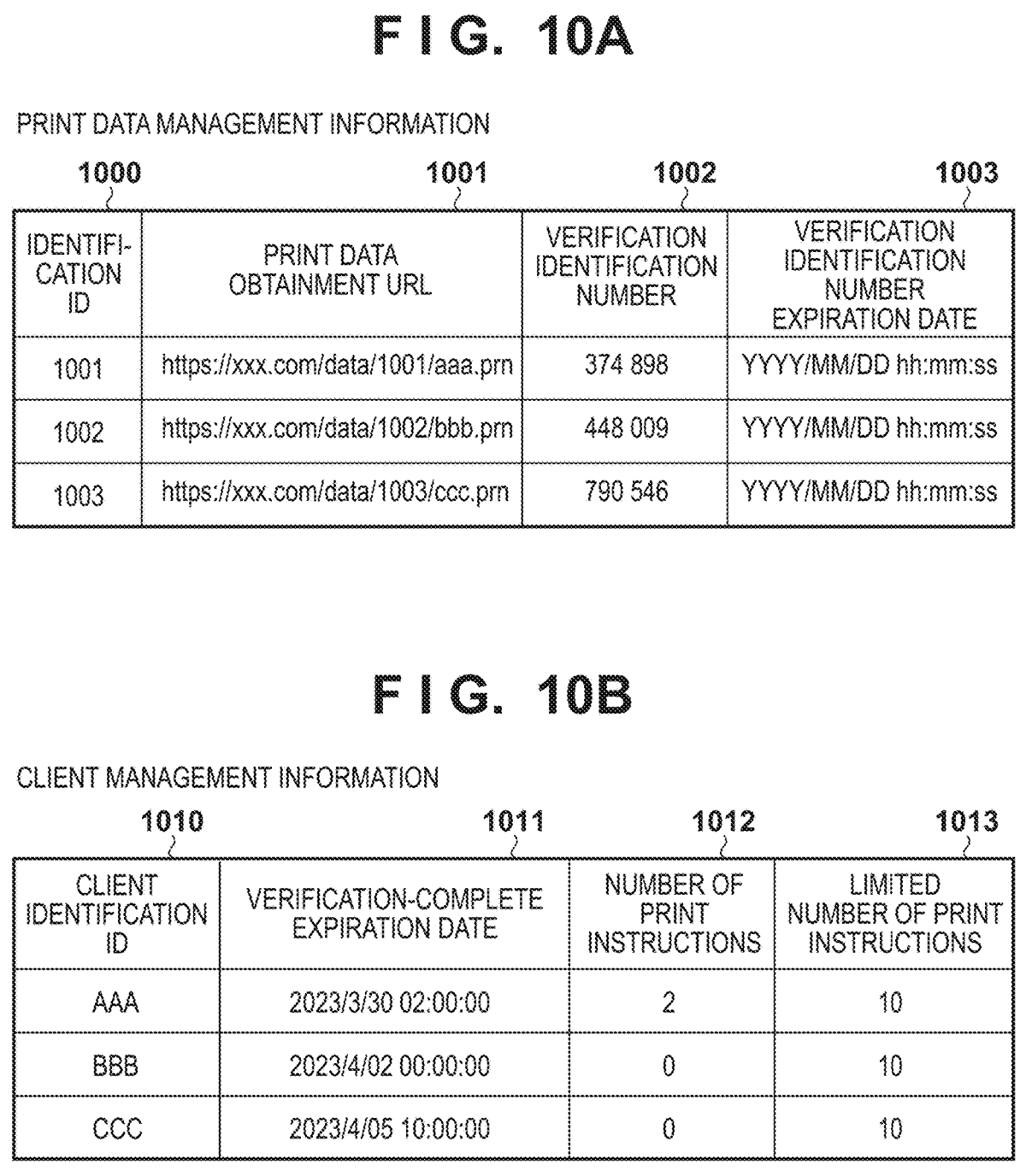

PRINT DATA MANAGEMENT INFORMATION

| IDENTIFICATION ID | PRINT DATA OBTAINMENT URL | VERIFICATION IDENTIFICATION NUMBER | VERIFICATION IDENTIFICATION NUMBER EXPIRATION DATE |
|---|---|---|---|
| 1001 | https://xxx.com/data/1001/aaa.prn | 374 898 | YYYY/MM/DD hh:mm:ss |
| 1002 | https://xxx.com/data/1002/bbb.prn | 448 009 | YYYY/MM/DD hh:mm:ss |
| 1003 | https://xxx.com/data/1003/ccc.prn | 790 546 | YYYY/MM/DD hh:mm:ss |

FIG. 10B

CLIENT MANAGEMENT INFORMATION

| CLIENT IDENTIFICATION ID | VERIFICATION-COMPLETE EXPIRATION DATE | NUMBER OF PRINT INSTRUCTIONS | LIMITED NUMBER OF PRINT INSTRUCTIONS |
|---|---|---|---|
| AAA | 2023/3/30 02:00:00 | 2 | 10 |
| BBB | 2023/4/02 00:00:00 | 0 | 10 |
| CCC | 2023/4/05 10:00:00 | 0 | 10 |

F I G. 10C

PRINT DATA MANAGEMENT INFORMATION

| IDENTIFICATION ID (1000) | PRINT DATA OBTAINMENT URL (1001) | VERIFICATION IDENTIFICATION NUMBER (1002) | VERIFICATION IDENTIFICATION NUMBER EXPIRATION DATE (1003) | VERIFICATION-COMPLETE EXPIRATION DATE (1011) | NUMBER OF PRINT INSTRUCTIONS (1012) | LIMITED NUMBER OF PRINT INSTRUCTIONS (1013) |
|---|---|---|---|---|---|---|
| 1001 | https://xxx.com/data/1001/aaa.prn | 374 898 | YYYY/MM/DD hh:mm:ss | 2023/3/30 02:00:00 | 2 | 10 |
| 1002 | https://xxx.com/data/1002/bbb.prn | 448 009 | YYYY/MM/DD hh:mm:ss | 2023/4/02 00:00:00 | 0 | 10 |
| 1003 | https://xxx.com/data/1003/ccc.prn | 790 546 | YYYY/MM/DD hh:mm:ss | 2023/4/05 10:00:00 | 0 | 10 |

PRINTING SYSTEM AND METHOD OF CONTROLLING THE PRINTING SYSTEM

BACKGROUND OF THE INVENTION

Field of the Invention

The present invention relates to a printing system and a method of controlling the system.

Description of the Related Art

Conventionally, in a process of trading various products, handling various articles, and the like, for example, identification codes for facilitating management, storage, and the like are added to documents, labels, cards, and the like (e.g., order forms for products and articles, delivery statements, bills, product labels, in-stock product labels, tags, medical records, and prescription). These identification codes include one-dimensional codes (e.g., barcodes), two-dimensional codes, and the like, and by the reading of such codes, handling, management, storage, and the like of documents, products, articles, and the like can be facilitated. Further, by displaying reservation confirmation data or order details in an encoded manner in systems for making reservations for concerts and the like by mobile phone or for ordering food, confirmation of reservation can be simplified.

Further, even for multifunction peripherals located in an office environment, homes, and public places, there is a technique in which information that contains a storage destination of print data is encoded and, by a multifunction peripheral reading the code, that print data is obtained and printed by the multifunctional peripheral. Japanese Patent Laid-Open No. 2020-1253 describes a technique in which a multifunction peripheral reads print information through a two-dimensional code presented by a smartphone, obtains print data from a storage destination contained in the print information, and prints the print data.

A mechanism in which a code for a print instruction is displayed on a client terminal and an image forming apparatus reads the code and performs printing has an advantage in that printing can be more easily performed compared to a mechanism in which a client terminal instructs an image forming apparatus to perform printing. However, with the mechanism in which a displayed code is read and printing is performed, there is a risk that a third party can perform printing by copying (imaging or duplicating) the displayed code and causing the copy to be read. When printing is thus instructed by a code for a print instruction being read, there is a problem that, if the code is copied and used, printing will be performed by an unexpected third party.

SUMMARY OF THE INVENTION

Embodiments of the present disclosure eliminate the above-mentioned issues with conventional technology.

A feature of embodiments of the present disclosure is to provide a technique that can address, for example, copying of a code by a third party, when displaying a code for print instruction on an information processing apparatus and, by causing an image forming apparatus to read the code, instructing the image forming apparatus to perform printing.

According to embodiments of the present disclosure, there is provided a printing system comprising an information processing apparatus, an image forming apparatus, and a server that provides a print service, the information processing apparatus comprising: one or more first controllers including one or more first processors and one or more first memories, the one or more first controllers configured to: make a request to the server for information for obtaining print data to be printed; based on the information, which is obtained from the server in response to the request, display a screen that includes a print code; make a request to the server for a verification identification number of the print data to be printed; and display on a display unit the verification identification number obtained from the server, the image forming apparatus comprising: one or more second controllers including one or more second processors and one or more second memories, the one or more second controllers configured to: read the print code displayed on the information processing apparatus; based on the read print code, display a screen for inputting the verification identification number displayed on the display unit; transmit information included in the print code and the verification identification number inputted via the screen to the server; and in a case where the server successfully verifies the verification identification number, obtain the print data to be printed from the server and print the print data to be printed, and the server comprising: one or more third controllers including one or more third processors and one or more third memories, the one or more third controllers configured to: in response to the request for the information for obtaining the print data, transmit the information for obtaining the print data to be printed to the information processing apparatus; in response to the request from the information processing apparatus, generate the verification identification number of the print data to be printed and return the verification identification number of the print data to be printed to the information processing apparatus; verify the verification identification number transmitted from the image forming apparatus; and upon successfully verifying the verification identification number, in response to a request from the image forming apparatus, perform control so as to transmit the print data to be printed to the image forming apparatus.

According to embodiments of the present disclosure, there is provided a method of controlling a printing system comprising an information processing apparatus, an image forming apparatus, and a server that provides a print service, making, for the information processing apparatus, a request to the server for information for obtaining print data to be printed; displaying, for the information processing apparatus, a screen that includes a print code based on the information, which is obtained from the server in response to the request; making, for the information processing apparatus, a request to the server for a verification identification number of the print data to be printed; displaying, for the information processing apparatus, on a display unit the verification identification number obtained from the server; reading, for the image forming apparatus, the print code displayed on the information processing apparatus; displaying, for the image forming apparatus, a screen for inputting the verification identification number displayed on the display unit based on the read print code; transmitting, for the image forming apparatus, information included in the print code and the verification identification number inputted via the screen to the server; obtaining, for the image forming apparatus, the print data to be printed from the server and printing the print data to be printed in a case where the server successfully verifies the verification identification number; transmitting, for the server, the information for obtaining the print data to be printed to the information processing apparatus in response to the request for the information for obtaining the print data; in response to the request from the information processing apparatus, generating, for the server, the verification identification number of the print data to be printed and return the verification identification number of the print data to be printed to the information processing apparatus; verifying, for the server, the verification identification number transmitted from the image forming apparatus; and upon successfully verifying the verification identification number, in response to a request from the image forming apparatus, performing, for the server, control so as to transmit the print data to be printed to the image forming apparatus.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 10A is a diagram illustrating an example of print data management information managed by the print service according to the first embodiment.

FIG. 10B is a diagram illustrating an example of client management information held in a RAM in the second embodiment.

FIG. 10C is a diagram illustrating an example of print data management information held in a database according to the third embodiment.

DESCRIPTION OF THE EMBODIMENTS

Figure 1:
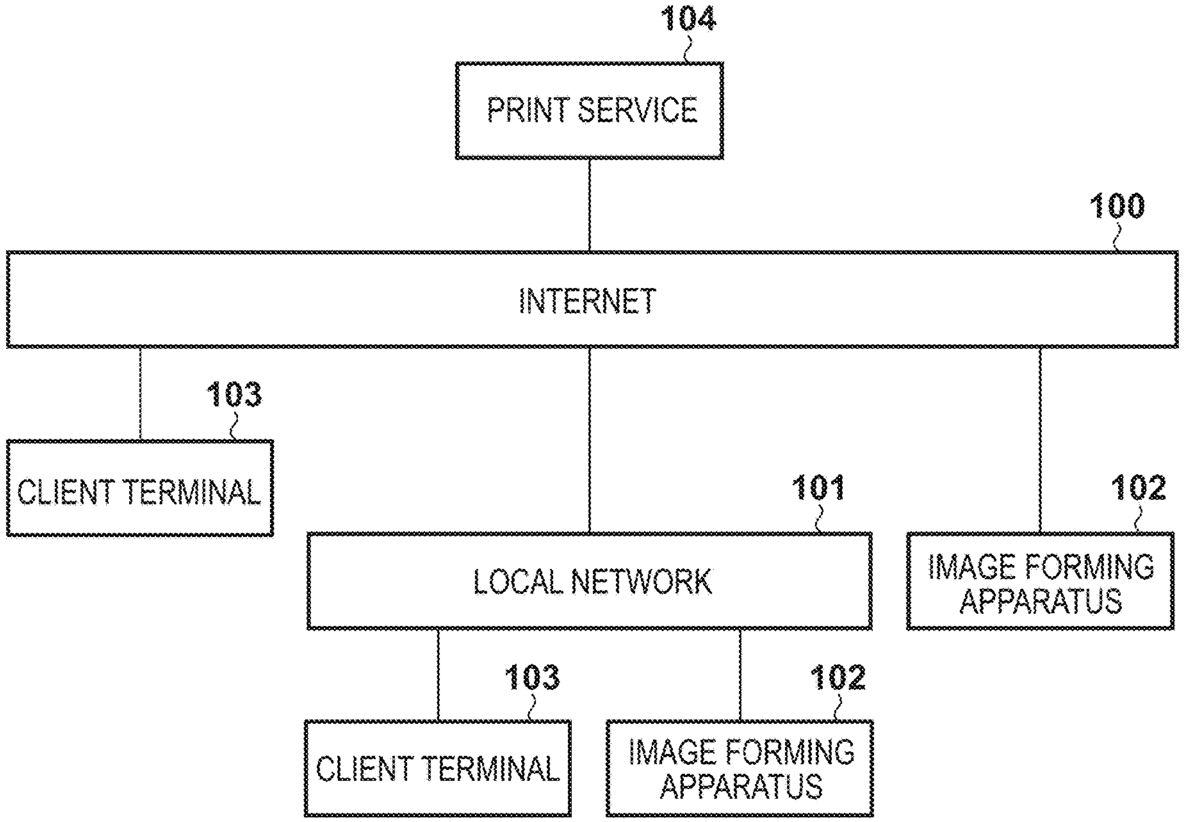
FIG. 1 is a diagram for describing an overall configuration of a system according to a first embodiment of the present invention.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. Further, in the accompanying drawings, the same or similar configurations are assigned the same reference numerals, and redundant descriptions are omitted.

First Embodiment

FIG. 1 is a diagram for describing an overall configuration of a printing system according to a first embodiment of the present invention.

Networks 100 and 101 each are a so-called communication network realized by, for example, a LAN or WAN (e.g., the Internet), a telephone line, a dedicated digital line, an ATM or frame relay line, a cable TV line, a wireless line for data broadcasting, or the like. In the first embodiment, the Internet 100 and the local network 101 are assumed and need only be able to transmit and receive data.

An image forming apparatus 102 and a client terminal 103 can access a print service 104 by accessing the Internet 100 via the local network 101. The image forming apparatus 102 and the client terminal 103 can also access the print service 104, which is a cloud service, by directly accessing the Internet 100. The print service 104 provides a service that holds a file uploaded from the client terminal 103 or the like, generates the print data of the file upon request, and transmits the print data to the image forming apparatus 102 to be printed.

The client terminal 103 is an information processing apparatus, such as a personal computer (PC) or mobile terminal for utilizing the service described above. The client terminal 103 is a computer device that is used by a user and transmits an instruction for generating print data to the print service 104 and generates and displays a code containing print request information. Here, the code is, for example, a one-dimensional code, such as a barcode, or a two-dimensional code, such as a two-dimensional barcode. Two-dimensional codes include matrix-type and stack-type codes. In the first embodiment, a code that contains print request information will be referred to as a print code.

The image forming apparatus 102 includes a copy function, a scanner function, a fax transmission function, and the like in addition to a print function. It also includes a reader that reads a print code containing print request information generated by the client terminal 103.

The print service 104 converts document data or the like into print data that can be printed by the image forming apparatus 102 according to an instruction from the client terminal 103 and provides the print data to the image forming apparatus 102. Here, the print service 104 is made available on the Internet as a cloud service that is redundant across a plurality of servers. Further, the functions of the print service 104 may be realized by a single server or a single virtual server or may be realized by a plurality of servers or a plurality of virtual servers. Alternatively, a plurality of virtual servers may be realized by being executed on a single server.

Figure 2A:
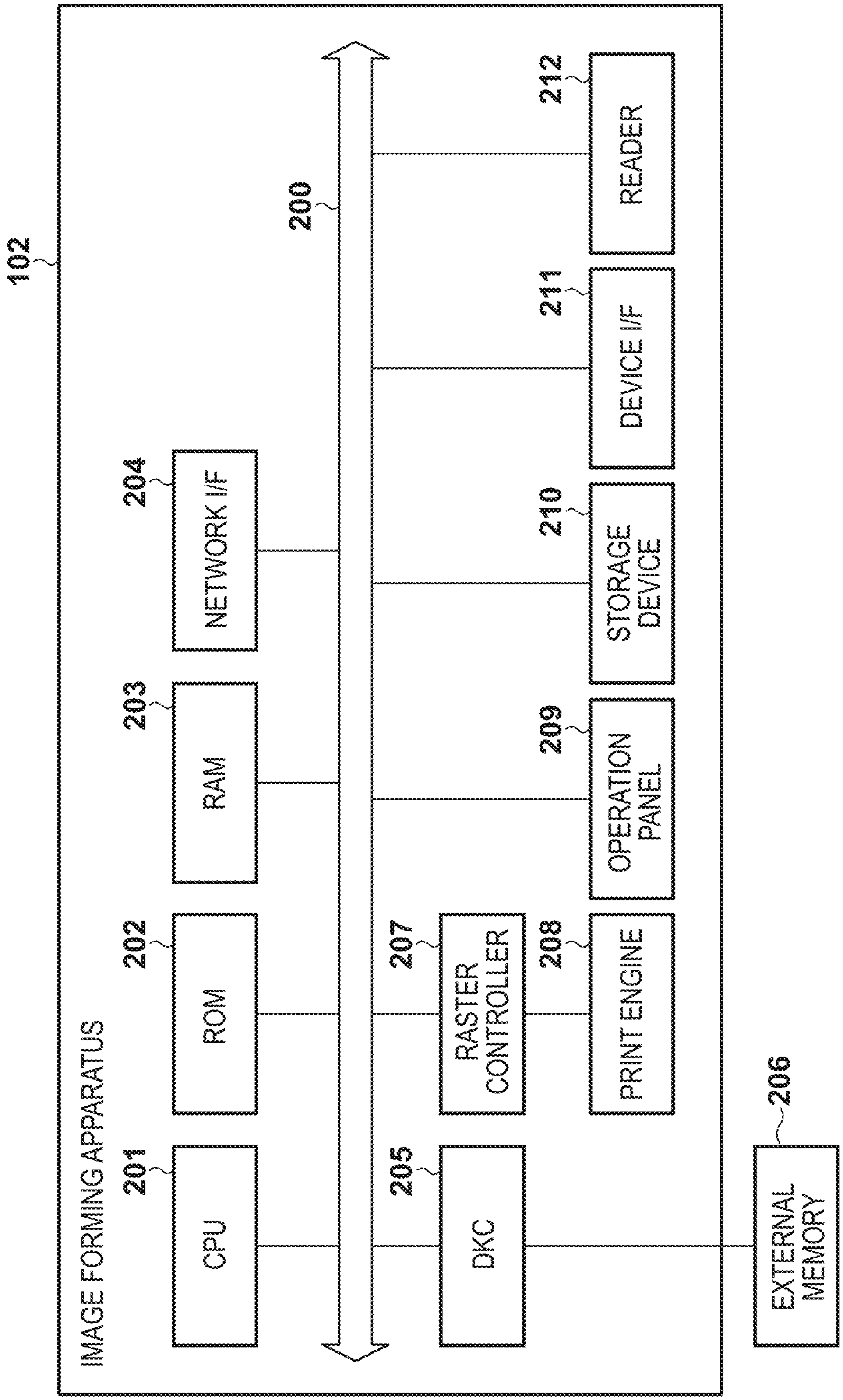
FIG. 2A is a diagram for describing a hardware configuration of an image forming apparatus according to the first embodiment.

FIG. 2A is a diagram for describing a hardware configuration of the image forming apparatus 102 according to the first embodiment. The respective components of the hardware are connected to a system bus 200.

A CPU 201 controls the entire apparatus and comprehensively controls access to various devices connected to the system bus 200. The control is based on a control program and the like stored in a ROM 202, a control program and resource data (resource information) stored in an external memory 206 connected via a disk controller (DKC) 205, or the like. A RAM 203 functions as a main memory, a work area, and the like of the CPU 201, and a memory capacity can be expanded using an optional RAM connected to an expansion port (not illustrated). A storage device 210 is an external storage device that functions as a large-capacity memory and stores a program and the like that causes the CPU 201 to function as respective functional units illustrated in FIG. 3, which will be described later.

An operation panel (operation unit) 209 displays a screen and accepts an operation instruction of a user via the screen. Further, a button and a display unit for performing operations (e.g., setting of operation mode and the like of the image forming apparatus 102, display of an operation status of the image forming apparatus 102, and designation of duplication) are also arranged. The operation panel 209 also performs, for example, display of a button for inputting a verification identification number for verifying a user that made a print request, which will be described later, and that inputted information and display of a code that contains a print request. Here, the verification identification number for verifying a user that made a print request is a number, such as a password or a personal identification number (PIN). The verification identification number is a secret numerical password shared between the system and the user and is used for user authentication in the system.

A network I/F 204 includes a network interface card (NIC), and data is exchanged with an external apparatus via the interface 204. A print engine 208 utilizes known printing techniques, and preferred embodiments include, for example, an electrophotographic method, an inkjet method, a sublimation-type (thermal transfer) method, and the like. A raster controller 207 converts image data into print data, which is in Page Description Language (PDL) or Portable Document Format (PDF). A device interface (I/F) 211 is a connection interface with an external device that can be connected via a USB or the like. A reader 212 is used for reading a document or for scanning, for example, a print code that contains print request information.

Figure 2B:
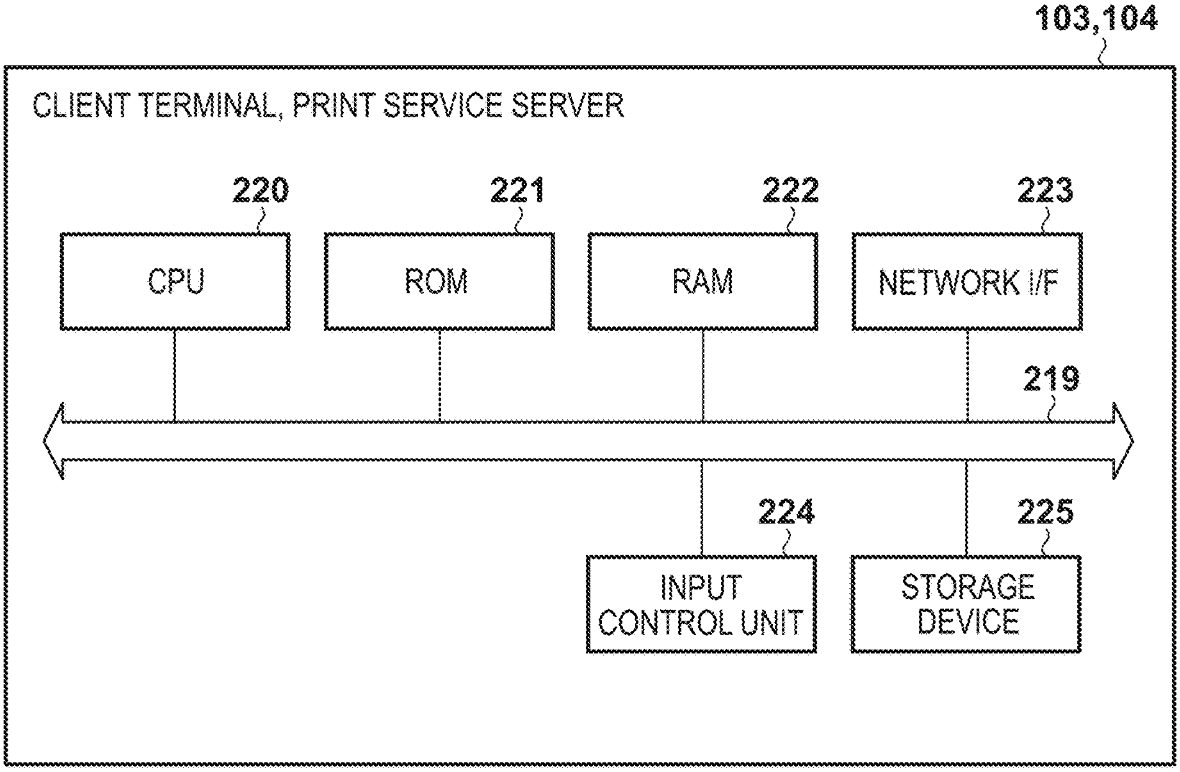
FIG. 2B is a diagram illustrating examples of hardware configurations of a client terminal and a server that provides a print service according to the first embodiment.

FIG. 2B is a diagram for describing examples of hardware configurations of the client terminal 103 and a server that provides the print service 104 according to the first embodiment. Unless otherwise specified, so long as the functions according to the embodiment can be realized, the client terminal 103 and the server may each be a single device or a system constituted of a plurality of devices. Further, unless otherwise specified, so long as the functions according to the embodiment can be realized, they may each be a system that is connected via a network, such as a LAN or WAN, and performs processing. In the embodiment, description will be given assuming that the respective components in an information processing apparatus such as the client terminal 103 and the server are connected via a system bus 219.

A CPU 220 functions as a control unit of the information processing apparatus and executes respective programs, which are a print application 310 (FIG. 3B), the print service 104, an operating system, and an application program stored in a storage device 225. The CPU 220 also performs control for temporarily storing, in a RAM 222, a file and information necessary for executing a program, for example. A ROM 221 stores programs, such as a basic I/O program and various kinds of data. The RAM 222 functions as a main memory, a work area, and the like of the CPU 220. A network I/F 223 includes a network interface card (NIC) and exchanges data with an external apparatus via the Internet 100, the local network 101, and the like. An input control unit 224 exchanges data with an external apparatus. The storage device 225 is one of external storage units and functions as a large-capacity memory and stores application programs, the OS, and the like.

Figure 3A:
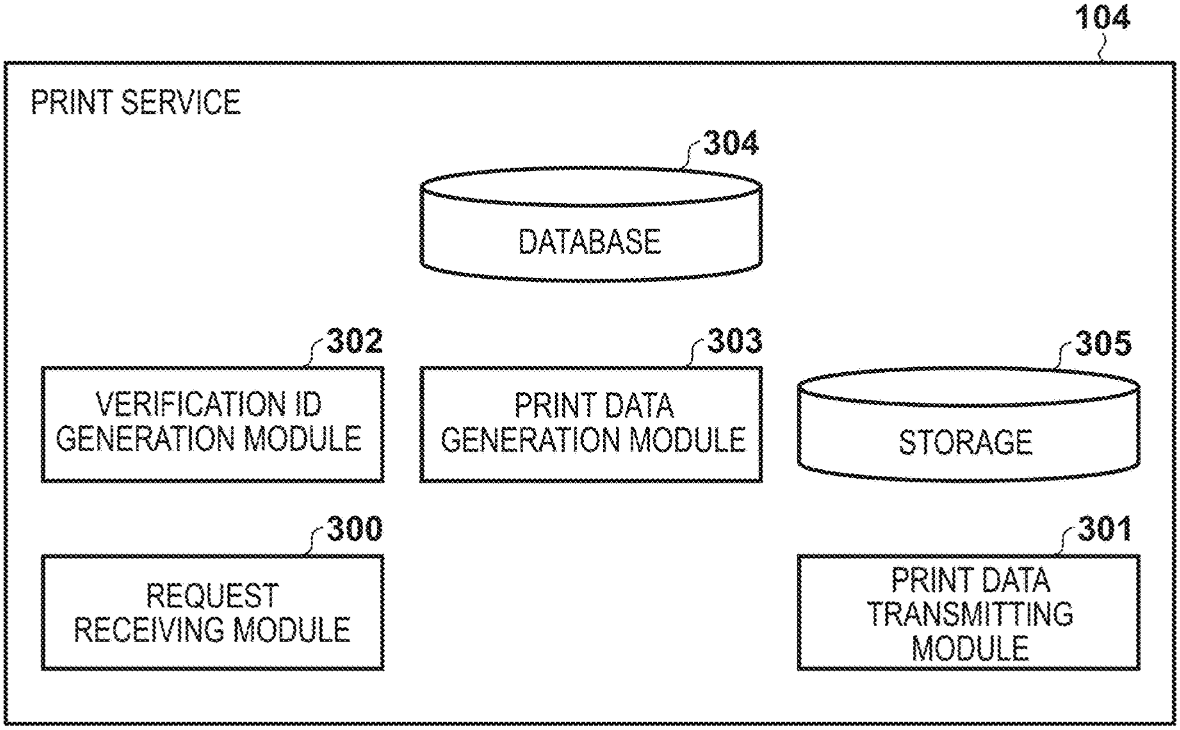
FIG. 3A is a diagram for describing a functional configuration of the print service according to the first embodiment.

FIG. 3A is a diagram for describing a functional configuration of the print service 104 according to the first embodiment. Respective software modules that realize these functions are stored in the storage device 225 illustrated in FIG. 2B, and these functions are realized by being deployed in the RAM 222 and executed by the CPU 220 as described above.

The print service 104 receives a request for generating print data and a request for generating a verification identification number from the print application 310 (FIG. 3B) of the client terminal 103 via a request receiving module 300. The request receiving module 300 provides various interfaces of the print service 104 using Hypertext Transfer Protocol (HTTP) and Hypertext Transfer Protocol Secure (HTTPS). HTTP or HTTPS establishes communication using a request transmitted by a client and a response returned by the server in TCP/IP. The request contains respective portions, which are a header field and a message, and an operation to be performed is designated using a method of the request. The response contains respective portions, which are a status line, a header field, and a message, and a processing result is indicated by a status code. Then, the request receiving module 300 verifies a validity of an authorization token attached to received request information. The received request information includes an identification ID (identification information) for identifying data to be printed. If it is verified to be a valid authorization token, the request receiving module 300 transmits the request information to a print data generation module 303 or to a verification ID generation module 302.

The print data generation module 303 registers the identification ID included in the received request information in print data management information held in a database 304. Then, the print data generation module 303 obtains data to be printed associated with the identification ID from a storage 305. The data to be printed is uploaded in advance from the print application 310 of the client terminal 103 or a cooperative service (not illustrated) and stored in the storage 305. Examples of cooperative services include point-of-sale information management service (POS services) and the like. The print data generation module 303 generates Page Description Language (PDL) data, which is print data, from the obtained data to be printed. Then, the print data generation module 303 stores the generated print data in the storage 305. Further, the print data generation module 303 generates a temporarily-signed print data obtainment URL for the stored print data and registers it in the print data management information of the database 304. The print data obtainment URL is a temporarily-signed URL with an expiration date. Further, a path hierarchy of the URL includes the identification ID of the print data.

Upon receiving a request for generating a verification identification number from the request receiving module 300, the verification ID generation module 302 generates a verification identification number and registers it in the print data management information of a designated identification ID of the database 304. Further, the verification ID generation module 302 registers an expiration date of the verification identification number in the print data management information. A verification identification number is a number used to confirm that a print code read by being held up to the reader 212 of the image forming apparatus 102 as a print request is valid. An expiration date of a verification identification number is a limitation to a validity of the verification identification number, and a verification identification number whose expiration date has expired will be determined to be invalid.

FIG. 10A is a diagram illustrating an example of print data management information managed by the print service 104 according to the first embodiment.

The print data management information includes an identification ID 1000 for identifying data to be printed, a print data obtainment URL 1001 which is a URL by which to obtain data to be printed, a verification identification number 1002, and an expiration date 1003 of the verification identification number.

The print service 104 returns the print data obtainment URL and the verification identification number to the print application 310 as a response to the print data generation request received from the print application 310 of the client terminal 103.

Regarding a print execution instruction assumed in the first embodiment, a print code generated by the print application 310, which will be described later, is read by the reader 212 of the image forming apparatus 102 upon the user holding the print code up to the reader 212 of the image forming apparatus 102. The image forming apparatus 102 decodes the read print code. The print code contains an identification ID and a print data obtainment URL, and the image forming apparatus 102 obtains print data from the print data obtainment URL obtained by decoding the print code and prints the print data.

Upon receiving from a print client 332 (FIG. 3C) of the image forming apparatus 102 a print data obtainment request that is based on the print data obtainment URL, a print data transmitting module 301 verifies a temporary signature attached to the print data obtainment URL. If there is no problem with an expiration date or the signature, print data stored in a print data storage path of the storage 305 included in the print data obtainment URL will be transmitted to the print client 332.

Figure 3B:
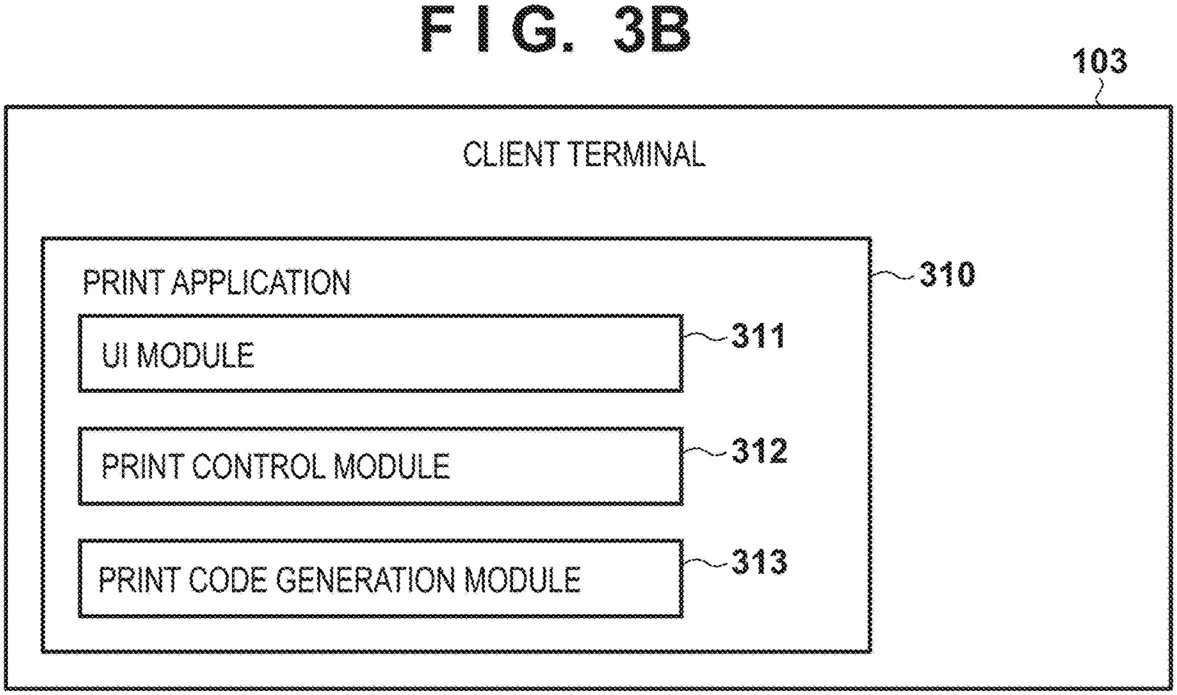
FIG. 3B is a diagram for describing a functional configuration of the client terminal.

FIG. 3B is a diagram for describing a functional configuration of the client terminal 103.

Software modules that realize these functions are stored in the storage device 225 illustrated in FIG. 2B, and these functions are realized by being deployed in the RAM 222 and executed by the CPU 220 as described above.

Figure 4C:
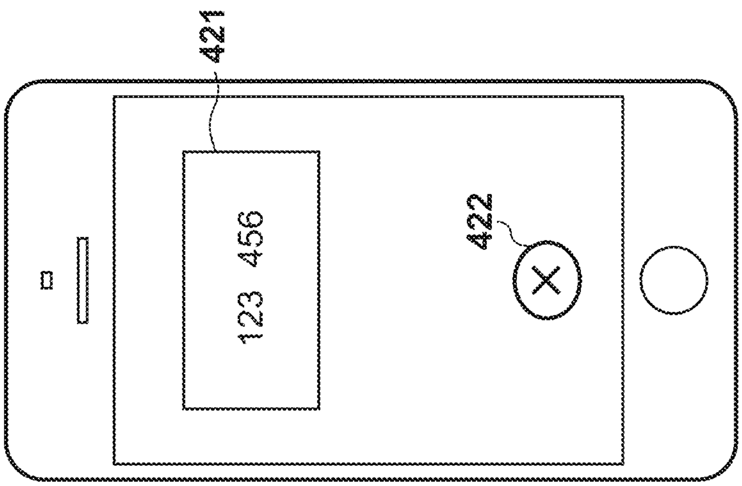
FIGS. 4A to 4C are diagrams illustrating examples of screens to be displayed by a UI module of a print application of the client terminal.
Figure 4B:
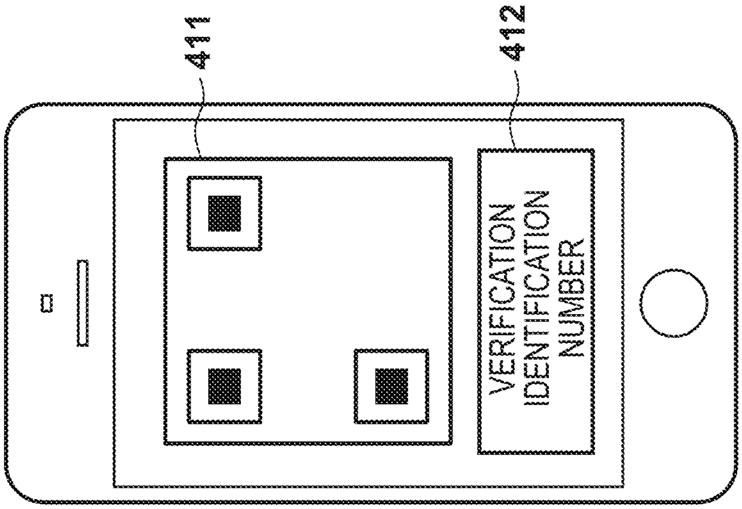
Figure 4A:
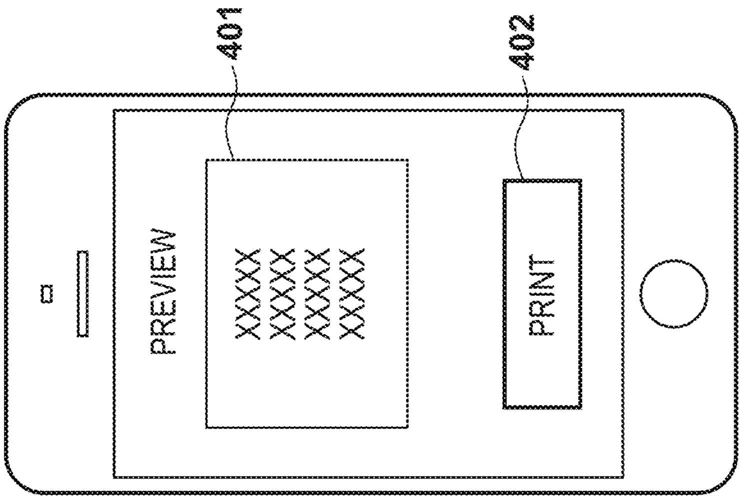

FIGS. 4A to 4C are diagrams illustrating examples of screens to be displayed by a UI module 311 of the print application 310 of the client terminal 103. Here, the print application 310 of the client terminal 103 will be described with reference to FIG. 3B and FIGS. 4A to 4C. Here, the client terminal 103 is indicated as an example of a mobile device, such as a portable terminal.

The print application 310 of the client terminal 103 is an application that requests the print service 104 to generate print data, generates and displays a print code, and displays a verification identification number obtained from the print service 104.

FIG. 4A illustrates an example in which a preview display 401 in which an illustrative image of a print result of data to be printed is displayed and a print button 402 with which execution of printing of that print target is instructed are displayed. The preview display 401 displays a preview image of a first page of a print target. When the print button 402 is pressed by the user, the user interface (UI) module 311 of the print application 310 transmits a print instruction to a print control module 312 of the print application 310. The print control module 312 transmits a print data generation request to the print service 104 together with an identification ID of the data to be printed. Upon obtaining a print data obtainment URL from the print service 104, the print control module 312 transmits the identification ID and the print data obtainment URL to a print code generation module 313 of the print application 310. The print code generation module 313 generates a print code that includes the print data obtainment URL and the identification ID. Then, the print control module 312 transmits the print code generated by the print code generation module 313 to the UI module 311.

FIG. 4B illustrates an example in which a print code display portion 411 in which a print code is displayed and a verification identification number button 412 with which obtainment of a verification identification number is instructed are displayed. At this time, the UI module 311 displays the print code transmitted from the print control module 312 in the print code display portion 411. When the user presses the verification identification number button 412, the UI module 311 transmits a request for obtaining a verification identification number to the print control module 312. With this, the print control module 312 transmits a request for obtaining a verification identification number to the print service 104 together with the identification ID of the data to be printed. Upon obtaining a verification identification number from the print service 104, the print control module 312 transmits it to the UI module 311.

FIG. 4C illustrates an example in which a verification identification number display portion 421 in which a verification identification number obtained from the print service 104 is displayed and a close button 422 are displayed.

At this time, the UI module 311 displays the obtained verification identification number in the verification identification number display portion 421. When the user presses the close button 422, the UI module 311 closes the screen of FIG. 4C.

Here, in the first embodiment, a screen that includes the print code display portion 411 of FIG. 4B and a screen that includes the verification identification number display portion 421 of FIG. 4C are displayed as separate screens.

In the first embodiment, the purpose is to prevent the screen that includes the print code display portion 411 illustrated in FIG. 4B from being printed and passed to and improperly used by a third party. When the print code display portion 411 and the verification identification number display portion 421 are displayed on the same screen, if the screen is printed, a verification identification number may be passed to a third party along with a print code, and so, these each are displayed on a separate screen.

Figure 3C:
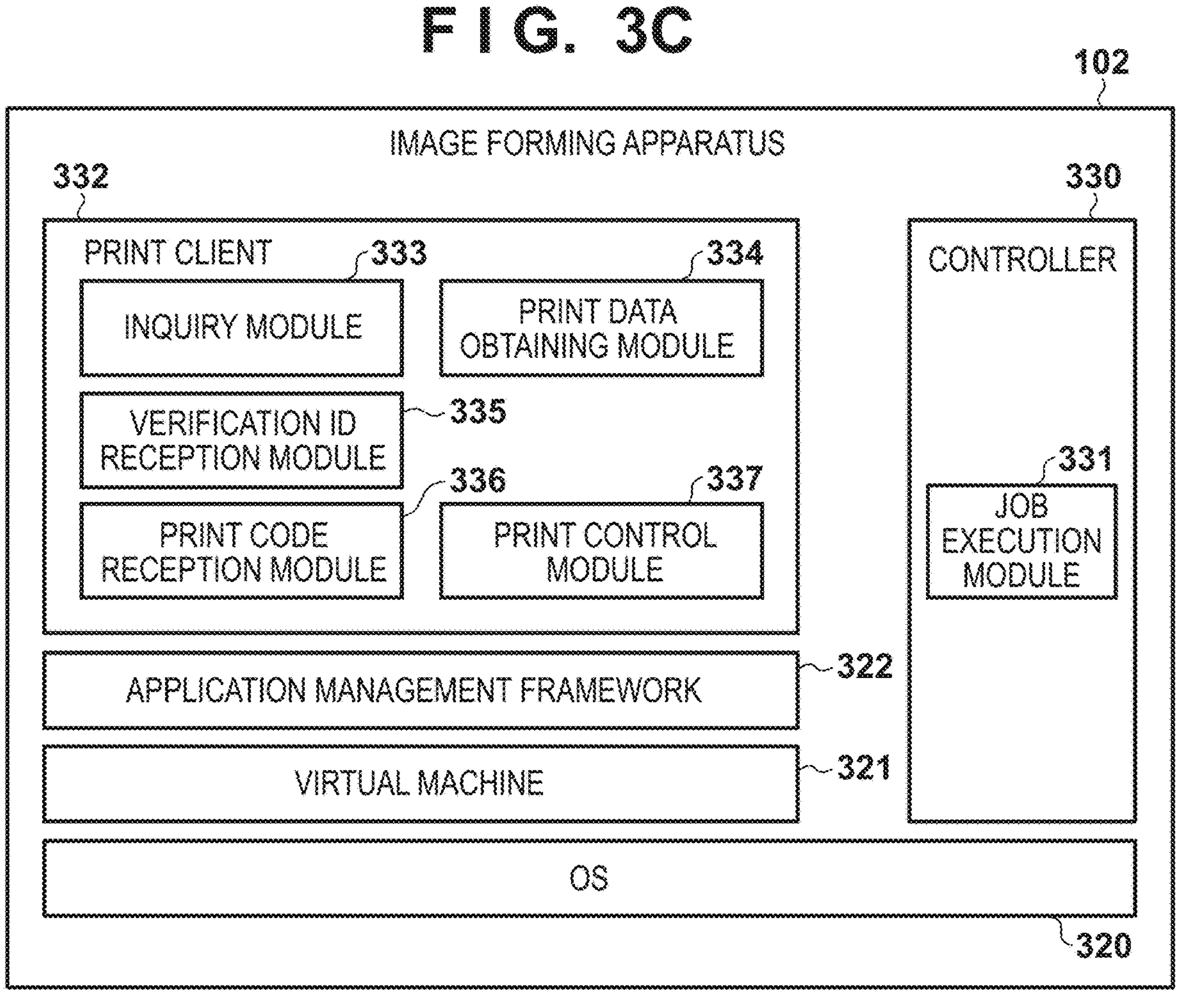
FIG. 3C is a diagram for describing a program and a functional configuration of the image forming apparatus according to the first embodiment.

FIG. 3C is a diagram for describing a program and a functional configuration of the image forming apparatus 102 according to the first embodiment. These functions are realized by an OS and a program stored in the ROM 202 or the external memory 206 being deployed in the RAM 203 and executed by the CPU 201.

An OS 320 is an OS of the image forming apparatus 102, and generally, a real-time OS is used, but recently, a general-purpose OS, such as Linux®, has sometimes been used. Regarding a virtual machine 321, Java® VM, for example, is well known. The virtual machine 321 is a virtual application execution environment that operates as an application controlled by the OS. An application management framework 322 includes a function for managing a lifecycle of an application to be managed that operates on the application execution environment provided by the virtual machine 321. It also includes a function for publishing an interface for controlling the lifecycle of an application and an interface for mediating processing requests between respective applications. Assume that a lifecycle indicates a status of an application, including installation, start, stop, and uninstallation of the application.

Description will be given assuming that the application management framework 322 is Open Services Gateway initiative (OSGi)® set forth by OSGi Alliance. The print client 332 is an application that operates in the application execution environment provided by the virtual machine 321. These applications are identified using ApplicationIDs, and lifecycles are managed by the application management framework 322. Here, applications that operate in the application management framework 322 may be held in the image forming apparatus 102 by default or may also be installed later via the application management framework 322.

A controller 330 is a control program that performs functional processing, such as printing, copying, and faxing, of the image forming apparatus 102 and manages a status of the image forming apparatus 102. When the print code display portion 411 (FIG. 4B) of the client terminal 103 is held up to the reader 212 by the user, the controller 330 reads a print code displayed thereon. Then, the print code is transmitted to a print code reception module 336 of the print client 332.

Upon receiving print data transmitted from a print control module 337 of the print client 332, a job execution module 331 of the controller 330 executes print processing.

The print client 332 is a client application of the print service 104. Upon receiving a print code from the controller 330, the print code reception module 336 of the print client 332 decodes the print code and then transmits an identification ID included in the print code and issues a verification identification number input instruction to a verification ID reception module 335.

Upon receiving the instruction, the verification ID reception module 335 displays a verification identification number input screen on the operation panel (operation unit) 209. When the user inputs a verification identification number from the input screen, the verification ID reception module 335 transmits the inputted verification identification number and the identification ID to the print service 104 via an inquiry module 333.

With this, the verification ID generation module 302 of the print service 104 obtains, from the print data management information stored in the database 304, a verification identification number and an expiration date of the verification identification number, using the identification ID received from the print client 332 of the image forming apparatus 102 as a key. Further, the verification ID generation module 302 determines, from the expiration date of the verification identification number obtained from the print data management information, whether the verification identification number received from the print client 332 is before the expiration date. If it is before the expiration date, it is verified whether the verification identification number received from the print client 332 coincides with the verification identification number obtained from the print data management information. If they coincide, a response to that effect is returned to the inquiry module 333 of the print client 332.

Further, upon determining that the verification identification number is not before the expiration date, the verification ID generation module 302 clears the verification identification number and the expiration date of the verification identification number in the print data management information. Then, a response that the verification identification numbers do not coincide is returned to the inquiry module 333 of the print client 332. With this, the inquiry module 333 notifies the print control module 337 of a result of verification of the verification identification number in the print service 104. Then, upon receiving a notification that there is no problem with the verification of the verification identification number (OK), the print control module 337 obtains print data from the print data URL via a print data obtaining module 334. Then, the obtained print data is transmitted to the job execution module 331 of the controller 330. The job execution module 331 thus executes processing for printing print data.

Figure 5:
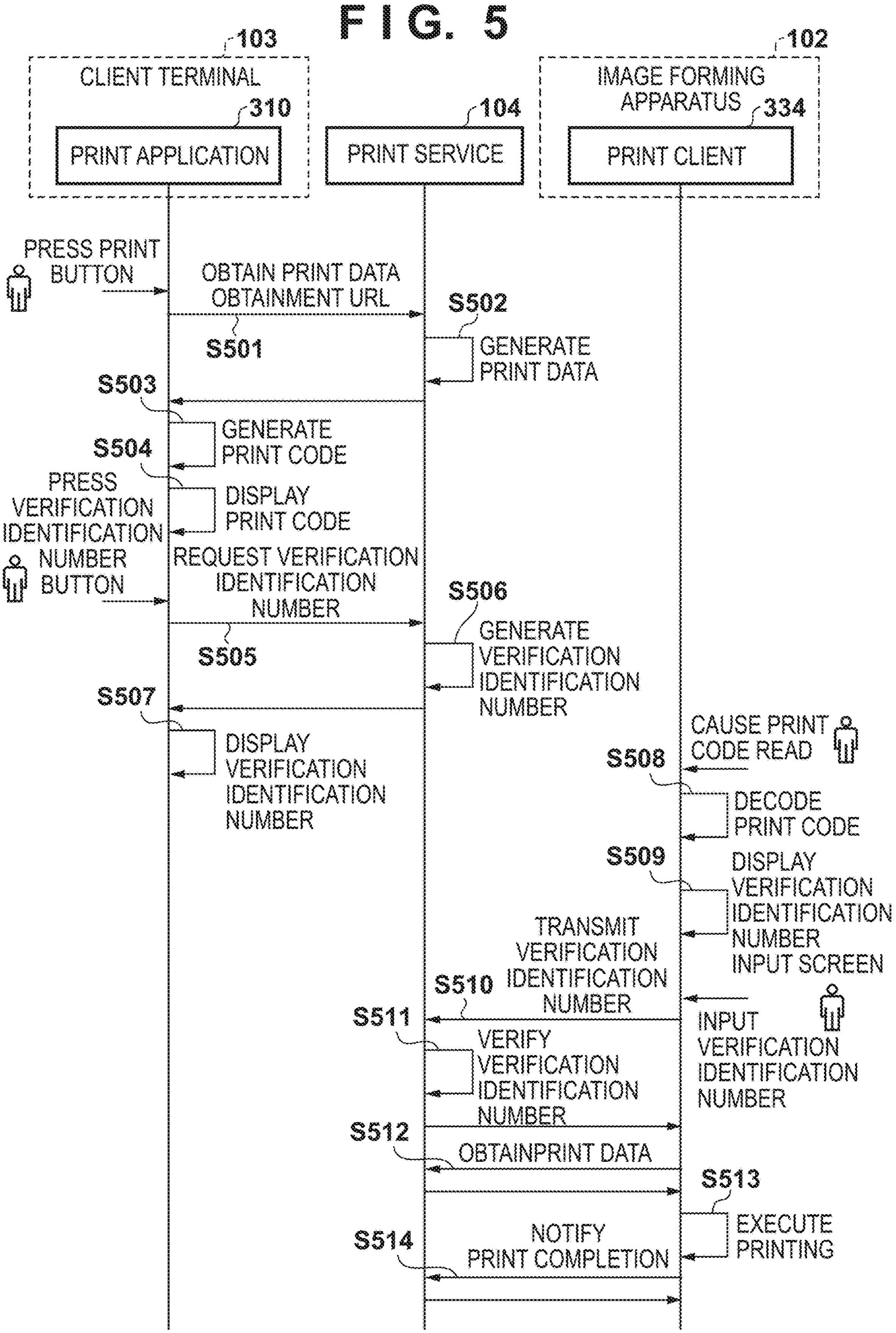
FIG. 5 is a diagram for explaining a sequence from when a user instructs printing of data on the client terminal to when the image forming apparatus obtains data from the print service and prints the data according to the first embodiment.

FIG. 5 is a diagram for explaining a sequence from when a user instructs printing of data on the client terminal 103 to when the image forming apparatus 102 obtains the data from the print service 104 and prints the data according to the first embodiment. The sequence is that from when print data is first generated in the print service 104 after the print application 310 has received a print instruction, until when a print code is held up to and decoded in the image forming apparatus 102, a verification identification number is inputted, and printing is executed in the image forming apparatus 102, under the control of the print client 332.

The user presses the print button 402 in a state in which data to be printed is displayed on the client terminal 103 as in FIG. 4A. With this, in step S501, the print application 310 of the client terminal 103 transmits a request for obtaining a print data obtainment URL to the print service 104 together with an identification ID for identifying the data to be printed. With this, in step S502, the print service 104 registers print data management information in the database 304, generates print data from the data to be printed indicated by the identification ID stored in the storage 305, and stores the print data in the storage 305. Then, the print service 104 returns a temporarily-signed print data obtainment URL to the print application 310. The data format of the print data stored in the storage 305 is in a Page Description Language (PDL) format, which can be interpreted by the image forming apparatus 102.

Next, in step S503, the print application 310 generates a print code that contains the print data obtainment URL received from the print service 104 and the identification ID for identifying the data to be printed. In step S504, the UI module 311 of the print application 310 displays the generated print code on the print code display portion 411 as in FIG. 4B.

Next, the user presses the verification identification number button 412 displayed in FIG. 4B. With this, in step S505, the print application 310 of the client terminal 103 transmits a request for obtaining a verification identification number to the print service 104 together with the identification ID indicating the data to be printed. With this, in step S506, the print service 104 generates a verification identification number in response to the request and returns it to the print application 310. With this, in step S507, the UI module 311 of the print application 310 displays the verification identification number received from the print service 104 in the verification identification number display portion 421 as illustrated in FIG. 4C.

Next, the user causes the reader 212 of the image forming apparatus 102 to read the print code displayed on the print code display portion 411. With this, in step S508, the print client 332 of the image forming apparatus 102 decodes the print code. Then, upon successfully decoding the print code, in step S509 the print client 332 displays a screen (not illustrated) for inputting a verification identification number on the operation panel 209. Then, the user inputs, from the operation panel 209, the verification identification number displayed on the verification identification number display portion 421. With this, in step S510, the print client 332 transmits the identification ID of the data to be printed obtained by decoding the print code and the inputted verification identification number to the print service 104 and requests for verification of the verification identification number.

In step S511, the print service 104 verifies a validity of the verification identification number based on the identification ID of the data to be printed received in step S510 and returns a verification result to the print client 332. Then, when the result of the verification is that the verification identification number is valid, in step S512 the print client 332 accesses the print service 104 using the temporarily signed print data obtainment URL obtained from the print code and obtains the print data to be printed. Then, in step S513, when the print client 332 passes the print data to the job execution module 331 of the controller 330, the job execution module 331 executes processing for printing the received print data. Then, in step S514, upon receiving a print completion notification from the controller 330, the print client 332 transmits a print completion notification indicating that printing has been completed to the print service 104.

Figure 6:
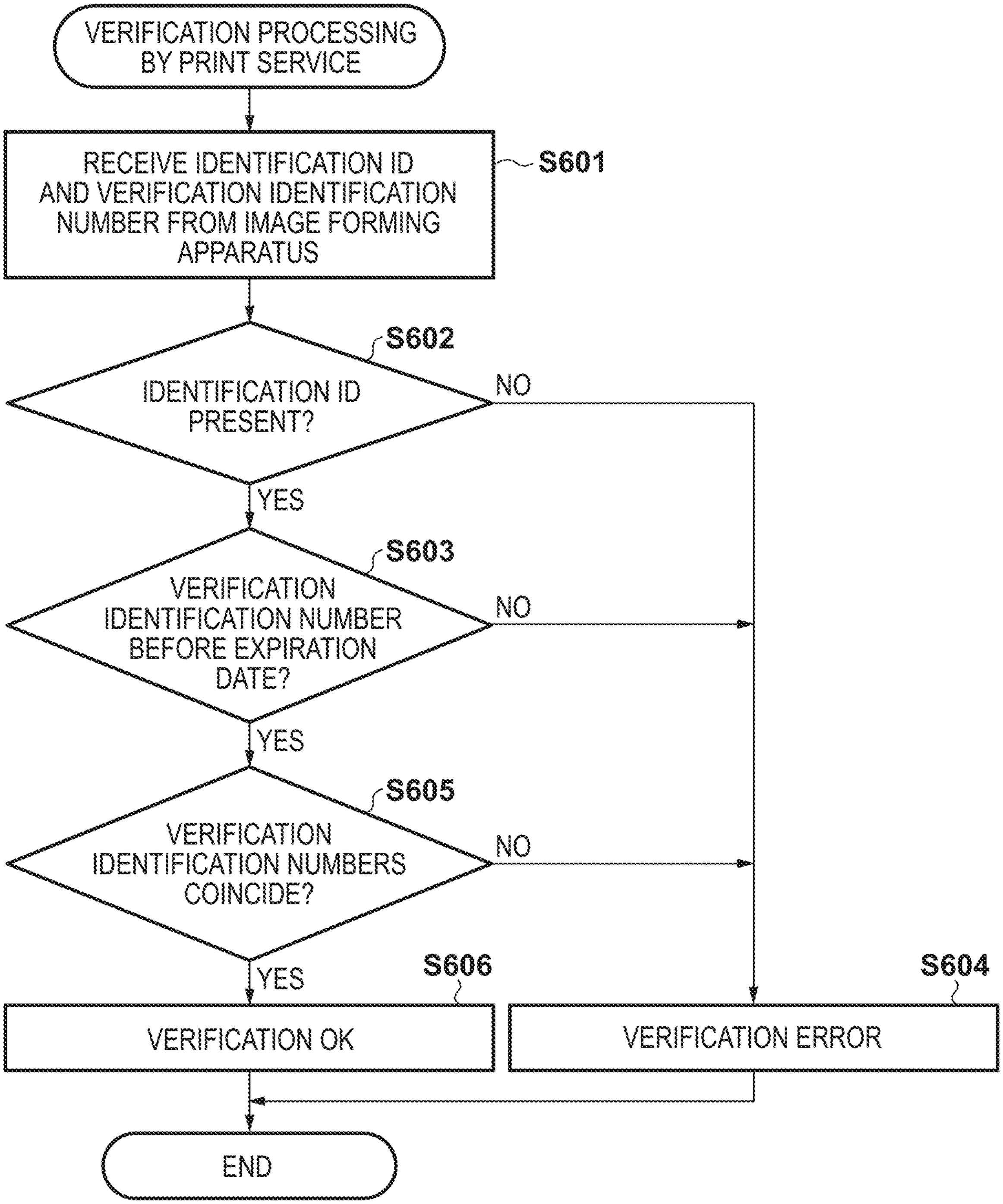
FIG. 6 is a flowchart for explaining verification processing for verifying a verification identification number by the print service according to the first embodiment.

FIG. 6 is a flowchart for explaining verification processing for verifying a verification identification number by the print service 104 according to the first embodiment. The processing described in this flowchart is realized by the CPU 220 of the server that provides the print service 104 executing a program deployed in the RAM 222.

First, in step S601, the CPU 220 of the server of the print service 104 receives an identification ID and a verification identification number of print data to be printed from the print client 332 of the image forming apparatus 102. Then, the processing proceeds to step S602, and the CPU 220 obtains a verification identification number that coincides with the received identification ID and an expiration date of the verification identification number from the print data management information of the database 304. Here, if an identification ID that coincides with the received identification ID, a corresponding verification identification number, and an expiration date of that verification identification number have been obtained from the print data management information, the processing proceeds to step S603, and otherwise, the processing proceeds to step S604. In step S604, the CPU 220 terminates the processing as a verification error.

In step S603, the CPU 220 determines whether it is before an expiration date of the verification identification number transmitted from the print client 332. Here, if it is determined to be before the expiration date, the processing proceeds to step S605, and if it is determined to be not before the expiration date, the processing proceeds to step S604, and the processing is terminated as a verification error.

In step S605, the CPU 220 determines whether the verification identification number received from the print client 332 coincides with the verification identification number corresponding to the identification ID obtained in step S602 from the print data management information of the database 304. Here, if it is determined that they coincide, the processing proceeds to step S606, and the CPU 220 returns a response that verification is OK to the print client 332 and terminates the processing. Further, in step S605, if the verification identification numbers do not coincide, the processing proceeds to step S604, and the CPU 220 returns a response that verification is NG to the print client 332 and terminates the processing.

As described above, according to the first embodiment, the client terminal, which instructed printing, obtains a print data obtainment URL, which is for obtaining data to be printed, from the cloud service and generates and displays a print code that includes the URL. Further, the client terminal obtains a verification identification number that corresponds to the print code from the cloud service and displays it. The user of the client terminal causes the image forming apparatus to read the displayed print code and inputs the displayed verification identification number to the image forming apparatus. With this, the image forming apparatus transmits the inputted verification identification number to the cloud service and causes the cloud service to perform verification and, upon successful verification, obtains print data from the print data obtainment URL included in the print code and prints the print data. This makes it possible to avoid a security risk in which a print code is copied (captured in a photo or duplicated) and a third party can perform printing by causing the image forming apparatus read that copy.

Second Embodiment

When repeatedly instructing printing by the same client terminal 103, it is cumbersome and usability is poor for the user to input a verification identification number each time that they hold the displayed print code up to the image forming apparatus. Therefore, when repeatedly instructing printing from the same client terminal 103 within a predetermined period, it is possible to skip verification of a verification identification number and perform printing within a specific period or up to a specific number of times of printing. By doing so, it is possible to eliminate the hassle for the user of, for example, holding a displayed print code up to the image forming apparatus and input a verification identification number each time that they instruct printing. An example in which usability is thus improved will be described as a second embodiment. A configuration of the system, configurations of apparatuses, and the like according to the second embodiment are similar to those of the first embodiment described above, and so, description thereof will be omitted.

In the second embodiment, description will be given using an example in which, when repeatedly instructing printing from the same client terminal 103 within a predetermined period, processing for skipping verification of a verification identification number within a specific period or up to a specific number of times is executed in the image forming apparatus 102. However, the processing may be performed in the print service 104. In the second embodiment, assume that a print code generated by the print application 310 of the client terminal 103 includes an identification ID of data to be printed, a print data obtainment URL, and a client identification ID for identifying the client terminal 103.

Figure 7A:
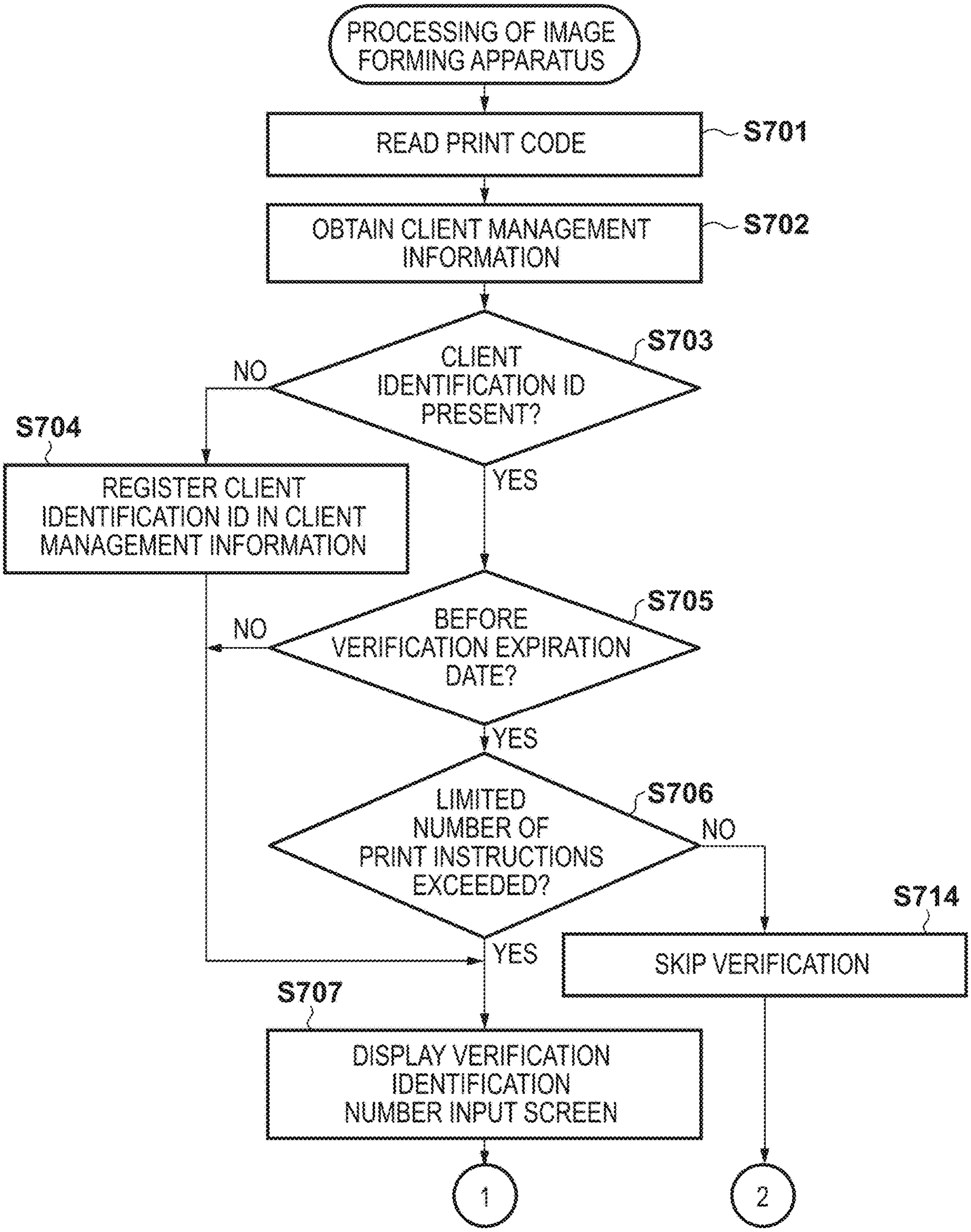
FIGS. 7A and 7B are flowcharts for explaining processing in which the image forming apparatus reads a print code, obtains print data from a print service, and prints the print data according to a second embodiment.
Figure 7B:
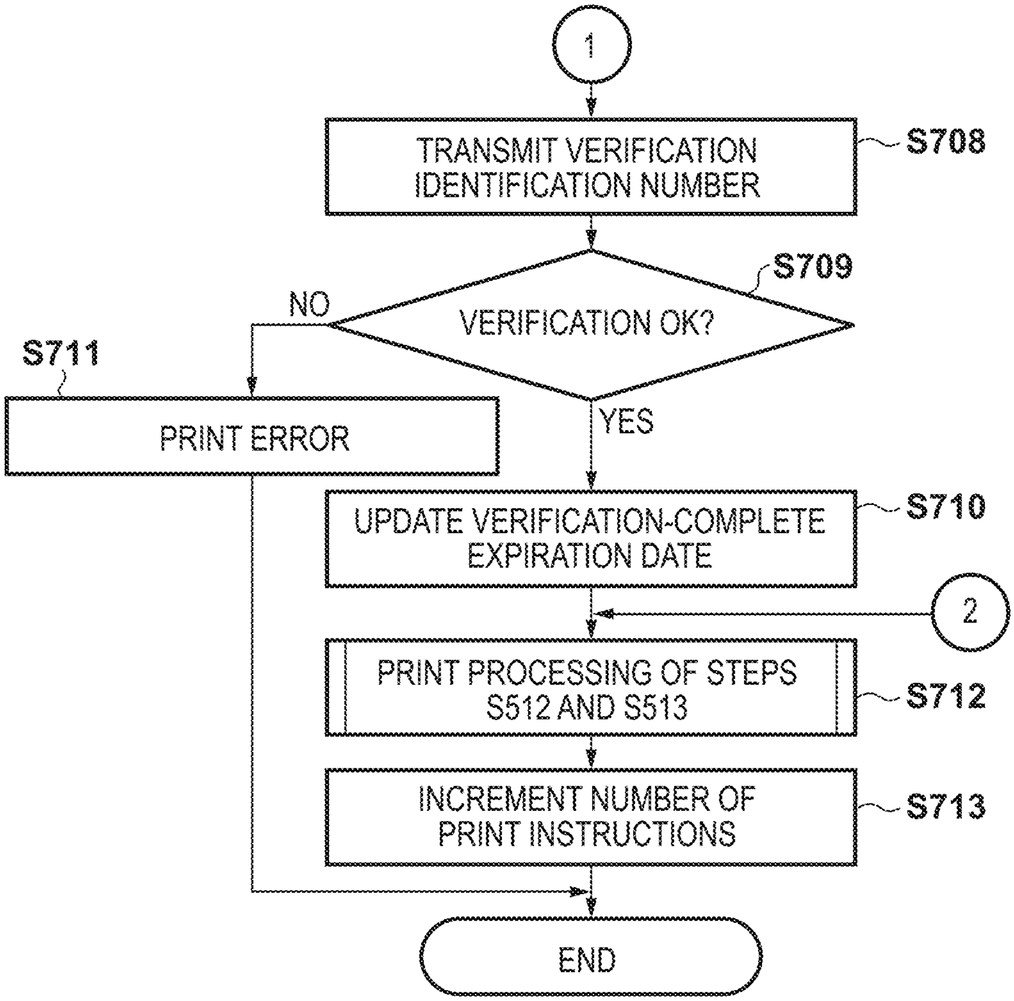

FIGS. 7A and 7B are flowcharts for explaining processing in which the image forming apparatus 102 reads a print code, obtains print data from the print service 104, and prints the print data according to the second embodiment. The processing described in this flowchart is realized by the CPU 201 of the image forming apparatus 102 executing a program of the print client 332 deployed in the RAM 203.

In step S701, the CPU 201 reads a print code held up to the reader 212. Then, the CPU 201 decodes the read print code and obtains a client identification ID, an identification ID of data to be printed, and a print data obtainment URL included in the print code. Then, the processing proceeds to step S702, and the CPU 201 obtains client management information held in the RAM 203.

FIG. 10B is a diagram illustrating an example of client management information held in the RAM 203 in the second embodiment.

A client identification ID 1010 is an identification ID (identification information) for uniquely identifying the client terminal 103. A verification-complete expiration date 1011 is a date and time obtained by adding a specific period to a date and time on which verification was last completed. A number of print instructions 1012 indicates how many times a print instruction has been made since verification was last completed. A limited number of print instructions 1013 indicates the number of print instructions (specific number of times described above) that verification of a verification identification number can be skipped after verification was first completed. Here, if a verification identification number corresponding to a print code generated by the print application 310 of the client terminal 103 is before a verification-complete expiration date and the number of print instructions made using the print code does not exceed the limited number of print instructions, verification of the verification identification number is skipped.

Next, the processing proceeds to step S703, and the CPU 201 confirms whether the client identification ID obtained from the print code is present in the client management information. If the obtained client identification ID is not present in the client management information, the processing proceeds to step S704, and the CPU 201 registers the client identification ID in the client management information and the processing proceeds to verification identification number input screen display processing of step S707.

Meanwhile, in step S703, if the CPU 201 determines that the client identification ID is present in the client management information, the processing proceeds to step S705, and the CPU 201 determines whether a verification expiration date has passed based on the current date and time and the verification-complete expiration date 1011. If it is determined that the expiration date has passed, the processing proceeds to the verification identification number input screen display processing of step S707. Meanwhile, if it is determined that the expiration date has not passed, the processing proceeds to step S706, and the CPU 201 determines whether the number of print instructions exceeds the limited number of print instructions. If it is determined to be not exceeded here, the processing proceeds to step S714, and the CPU 201 skips verification of the verification identification number and the processing proceeds to print processing of step S712 (FIG. 7B).

Meanwhile, in step S706, if it is determined that the number of print instructions exceeds the limited number of print instructions, the processing proceeds to the verification identification number input screen display processing of step S707. The processing from step S707 is substantially the same as in the first embodiment (S512 to S513) described above except for steps S710 and S713. In step S707, the CPU 201 displays an input screen (not illustrated) for inputting a verification identification number. When the user inputs a verification identification number via the input screen, the processing proceeds to step S708 (FIG. 7B), and the CPU 201 transmits the inputted verification identification number and the client identification ID obtained from the print code to the print service 104. Then, in step S709, a result of verification of a validity of that verification identification number is received from the print service 104, and if the verification has been successful (verification OK), the processing proceeds to step S710. In step S710, the CPU 201 updates the verification-complete expiration date with a date and time obtained by adding a specific period to the current date and time and proceeds to the print processing of step S712. Meanwhile, if the verification has been unsuccessful (verification NG), the processing proceeds to step S711, and the CPU 201 regards the print processing as an error and terminates the processing.

In step S712, the CPU 201 obtains print data of the data to be printed, from the print service 104, and transmits the print data to the job execution module 331 and executes print processing as described in steps S512 and S513 of FIG. 5. When the print processing is thus completed, the processing proceeds to step S713, the CPU 201 increments the number of print instructions stored in the RAM 203, registers it in the number of print instructions 1012 of the client management information, and terminates the processing.

When the print code and the validity of the verification identification number are confirmed (step S710), the image forming apparatus 102 updates the verification-complete expiration date corresponding to the client identification ID. Then, when printing is completed, the number of print instructions corresponding to the client identification ID is updated (step S713).

As described above, according to the second embodiment, when printing of the same print data is repeatedly instructed by the same client terminal 103 within a specific period, if a period in which verification for a verification identification number is complete is within a specific period or the number of times of printing is within a specific number of times, verification of the verification identification number can be skipped. This eliminates the need for the user to input a verification identification number each time printing is repeated and thereby makes it possible for the user to efficiently perform printing without the hassle.

Third Embodiment

Next, a third embodiment of the present invention will be described. In the third embodiment, when printing of the same print target is repeatedly instructed from the same client terminal 103 within a predetermined period, it is possible to skip verification of a verification identification number within a specific period and up to a specific number of times and perform printing, as in the second embodiment. A difference from the second embodiment is that, in the second embodiment, the image forming apparatus 102 determines whether it is within a specific period and a specific number of times but, in the third embodiment, the print service 104 performs the determination. A configuration of the system, configurations of apparatuses, and the like according to the third embodiment are similar to those of the first embodiment described above, and so, description thereof will be omitted.

Figure 8:
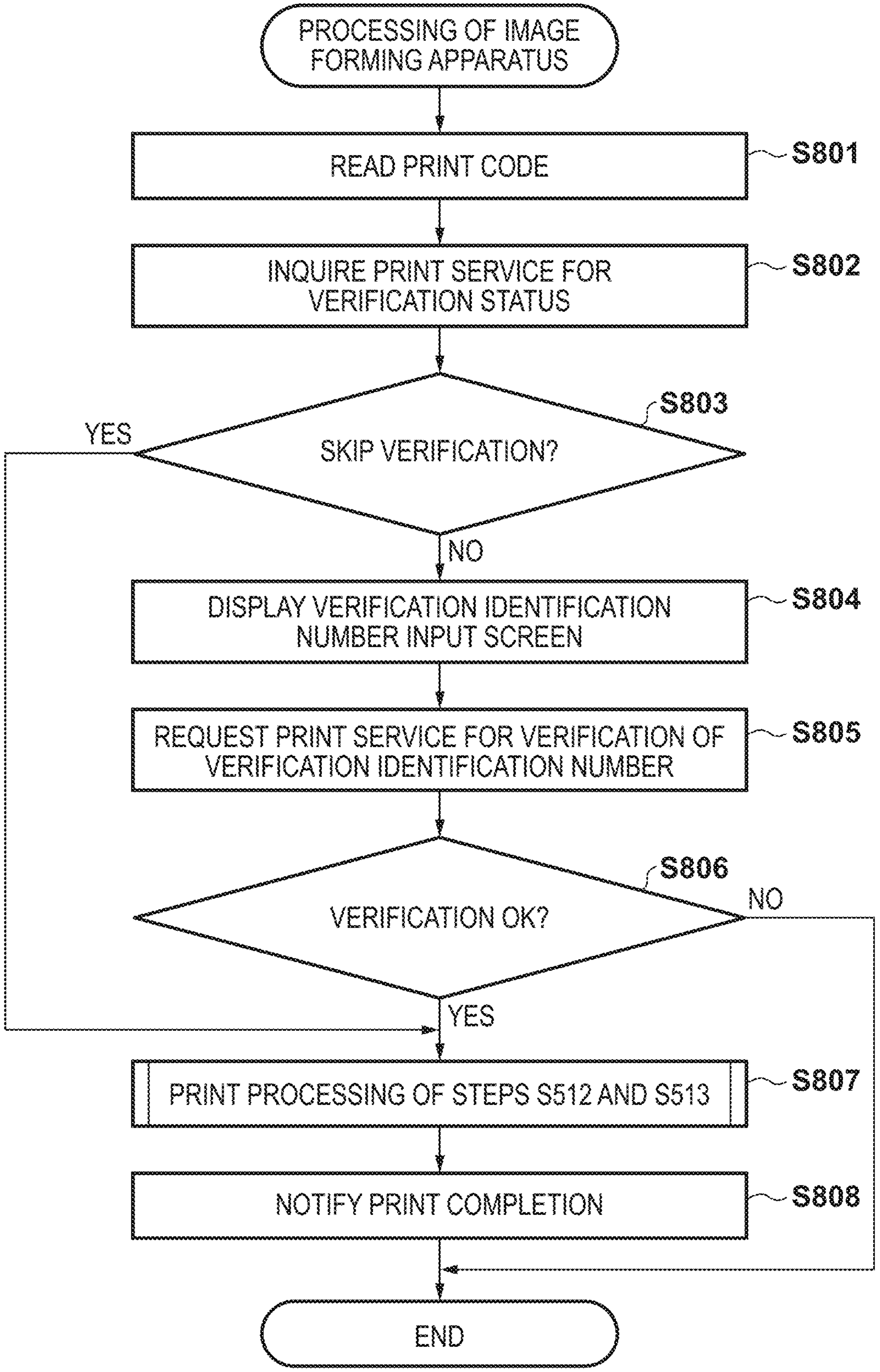
FIG. 8 is a flowchart for explaining print processing by the image forming apparatus according to a third embodiment.

FIG. 8 is a flowchart for explaining print processing by the image forming apparatus 102 according to the third embodiment. The processing described in this flowchart is realized by the CPU 201 of the image forming apparatus 102 executing a program of the print client 332 deployed in the RAM 203.

First, in step S801, the CPU 201 reads a print code displayed on the client terminal 103 held up to the reader 212. The print code is decoded, and an identification ID of print data to be printed and a client identification ID included in the print code are obtained. Next, the processing proceeds to step S802, and the CPU 201 makes an inquiry for a last verification status of a verification identification number of the client, together with the identification IDs. Then, the processing proceeds to step S803, and the CPU 201 determines whether a verification status result from the print service 104 is skip verification and, if a status is skip verification, the processing proceeds to print processing of step S807.

Meanwhile, in step S803, if the verification status result from the print service 104 is not skip verification, the processing proceeds to step S804. In step S804, the CPU 201 displays an input screen (not illustrated) for inputting a verification identification number, as in step S707 of FIG. 7, and accepts input of a verification identification number from the user. Then, the processing proceeds to step S805, and the CPU 201 makes a request for verification of a verification identification number by transmitting the inputted verification identification number, the identification ID of the print data to be printed, and the client identification ID to the print service 104. Then, the processing proceeds to step S806, and if verification OK is received from the print service 104 as a verification result of the verification identification number, the processing proceeds to step S807, and the CPU 201 obtains the print data from the print service 104, executes print processing, and the processing proceeds to step S808. In step S808, the CPU 201 transmits a print completion notification to the print service 104 and terminates the processing. Meanwhile, in step S806, upon receiving verification NG as the verification result of the verification identification number from the print service 104, the CPU 201 terminates the processing as is.

Figure 9A:
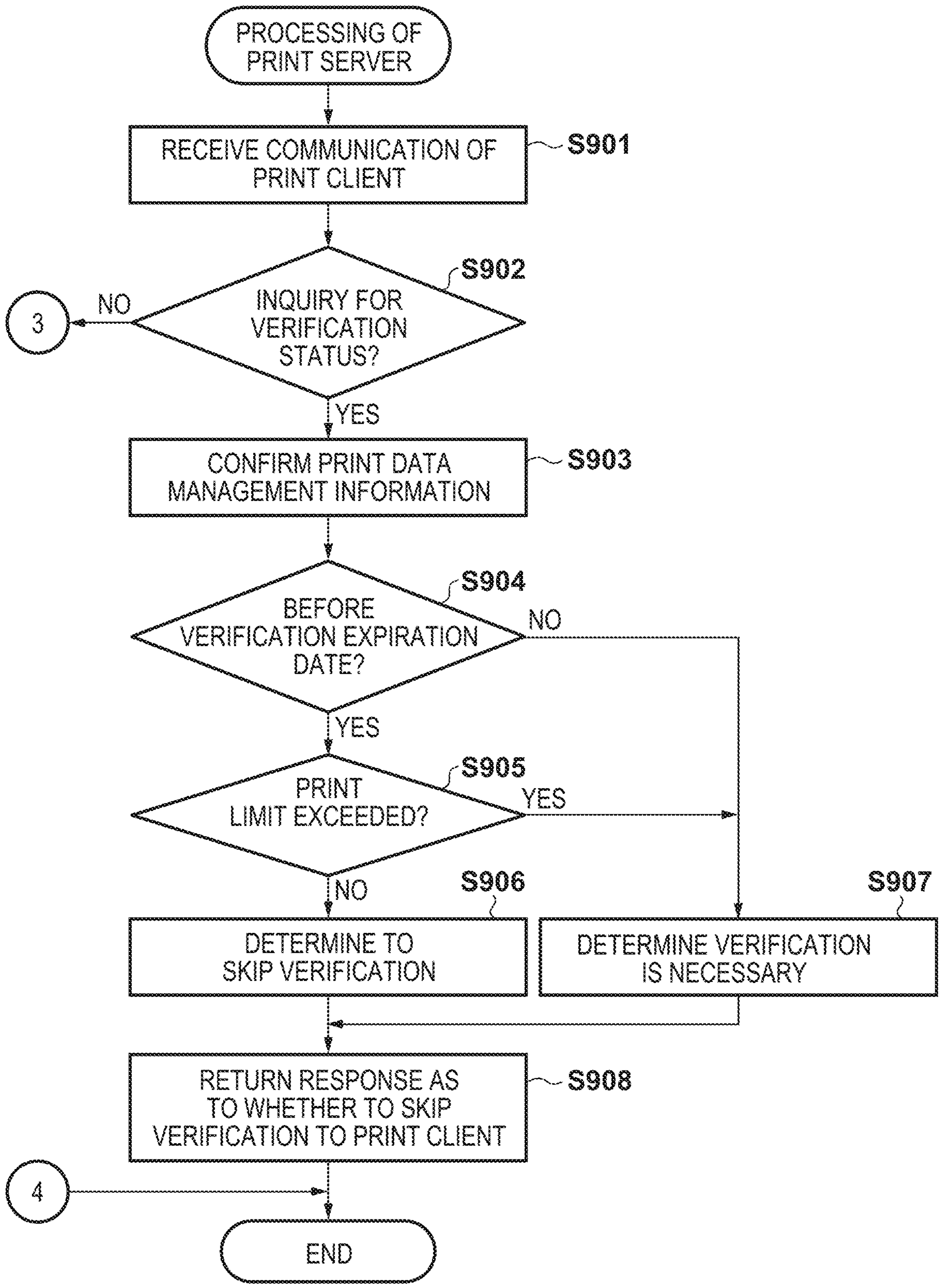
FIGS. 9A and 9B are flowcharts for explaining processing by the server of the print service according to the third embodiment.
Figure 9B:
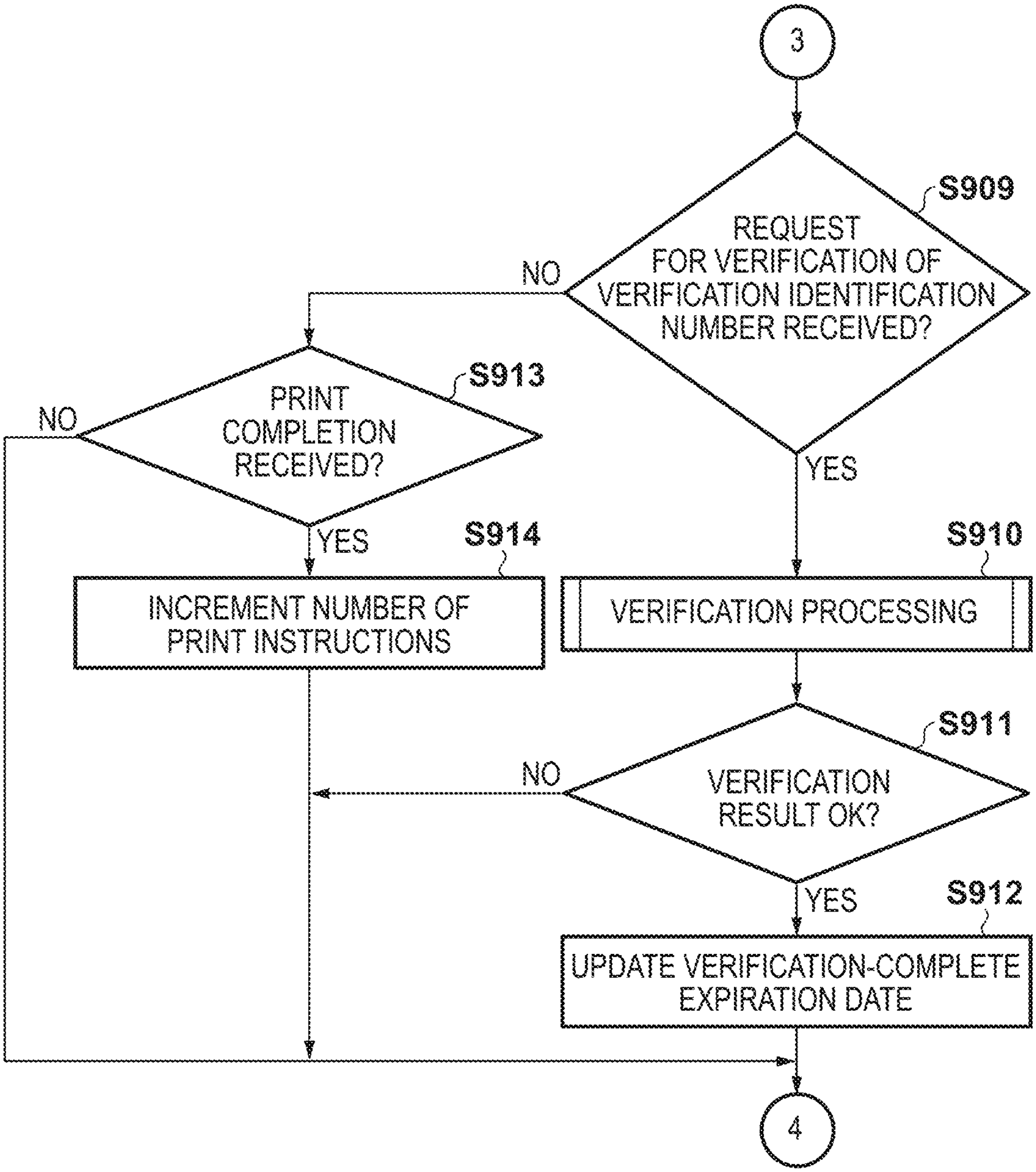

FIGS. 9A and 9B are flowcharts for explaining processing by the server of the print service 104 according to the third embodiment. The processing described in this flowchart is realized by the CPU 220 of the server that provides the print service 104 executing a program deployed in the RAM 222.

First, in step S901, the CPU 220 receives communication from the print client 332 of the image forming apparatus 102. Then, the processing proceeds to step S902, and the CPU 220 determines whether received content is the verification status inquiry transmitted in step S802 of FIG. 8 and, if so, the processing proceeds to step S903. In step S903, the CPU 220 obtains print data management information held in the database 304 based on an identification ID received from the print client 332 and the processing proceeds to step S904. Here, print data management information according to the third embodiment is illustrated in FIG. 10C.

FIG. 10C is a diagram illustrating an example of print data management information held in the database 304 of the print service 104 according to the third embodiment. In FIG. 10C, matters common to FIGS. 10A and 10B described above are indicated by the same reference numerals. In FIG. 10C, attribute values, such as the verification-complete expiration date 1011, the number of print instructions 1012, and the limited number of print instructions 1013 are stored in association with the identification ID 1000 for identifying data to be printed.

In step S904, the CPU 220 determines whether an expiration date of a verification identification number has passed based on the current date and time and a verification-complete expiration date. If it is determined that the verification-complete expiration date has not passed, the processing proceeds to step S905, and the CPU 220 determines whether the number of print instructions of data to be printed exceeds the limited number of print instructions. If it is determined to be not exceeded here, the processing proceeds to step S906, and the CPU 220 determines to skip verification of the verification identification number and the processing proceeds to step S908.

Meanwhile, if it is determined in step S904 that the verification-complete expiration date has passed or if it is determined in step S905 that the number of print instructions exceeds the limited number of print instructions, the processing proceeds to step S907, it is determined that verification of the verification identification number is necessary, and the processing proceeds to step S908. In step S908, the CPU 220 returns to the print client 332 a response as to whether it is necessary to verify the verification identification number, based on a result of the determination of step S906 or step S907, and terminates the processing. This response is received by the image forming apparatus 102 in step S803 of FIG. 8.

Meanwhile, in step S902, if it is determined that it is not a verification status inquiry, the processing proceeds to step S909 (FIG. 9B) and the CPU 220 determines whether the content received from the print client 332 is a request for verification of a verification identification number. If it is a verification request, the processing proceeds to step S910, and the CPU 220 executes the verification processing, which has been described with reference to the flowchart of FIG. 6, and returns a verification result to the print client 332. Then, the processing proceeds to step S911, and the CPU 220 determines whether the verification result is OK and, if it is a verification OK, the processing proceeds to step S912, the CPU 220 updates the verification-complete expiration date of the print data management information to a date and time obtained by adding a specific period to the current date and time, and terminates the processing. If it is not a verification OK in step S911, the CPU 220 terminates the processing.

Further, in step S909, if the CPU 220 determines that it is not a request for verification of a verification identification number, the processing proceeds to step S913, and the CPU 220 determines whether the content received from the print client 332 is a print completion notification. If so, the processing proceeds to step S914, and the CPU 220 increments (+1) the number of print instructions of the print data management information, and terminates the processing. Further, in step S913, if the content received from the print client 332 is not a print completion notification, the CPU 220 terminates the processing.

As described above, according to the third embodiment, when repeatedly printing the same data to be printed, if a verification-complete period of a verification identification number is within a specific period and a specific number of print instructions has not been exceeded, input of the verification identification number by the user is skipped. This eliminates the need for the user to input a verification identification number each time the same data to be printed is repeatedly printed and thereby makes it possible for the user to efficiently perform printing without the hassle.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-108520, filed Jun. 30, 2023, which is hereby incorporated by reference herein in its entirety.

What is claimed is:

1. A printing system comprising an information processing apparatus, an image forming apparatus, and a server that provides a print service, the information processing apparatus comprising:

one or more first controllers including one or more first processors and one or more first memories, the one or more first controllers configured to:

make a first request to the server for information for obtaining print data to be printed;

based on the information, which is obtained from the server in response to the first request, display a first screen that includes a print code on a display;

make a second request to the server for a verification identification number of the print data to be printed; and in accordance with receiving the verification identification number from the server in response to the second request, display a second screen, being separate from the first screen, including the verification identification number obtained from the server on the display, the image forming apparatus comprising:

one or more second controllers including one or more second processors and one or more second memories, the one or more second controllers configured to:

read the print code displayed on the first screen of the information processing apparatus;

based on the read print code, display an input screen for inputting the verification identification number displayed on the second screen;

transmit information included in the print code and the verification identification number inputted via the input screen to the server; and in accordance with successfully verifying the verification identification number at the server, transmit a data request to the server to obtain the print data to be printed from the server and print the obtained print data to be printed, and the server comprising:

one or more third controllers including one or more third processors and one or more third memories, the one or more third controllers configured to:

in response to the first request for the information for obtaining the print data, transmit the information for obtaining the print data to be printed to the information processing apparatus;

in response to the second request from the information processing apparatus, generate the verification identification number of the print data to be printed and transmit the verification identification number of the print data to be printed to the information processing apparatus;

verify the verification identification number transmitted from the image forming apparatus; and upon successfully verifying the verification identification number, in response to the data request from the image forming apparatus, perform control so as to transmit the print data to be printed to the image forming apparatus, wherein the print code includes Uniform Resource Locator, URL, of the print data and identification data of the print data, and wherein the verification identification number includes a password of a user that requests printing of the print data or a personal identification number of the user.

2. The printing system according to claim 1, wherein the one or more first controllers display, in the first screen that includes the print code, a button for instructing a request to the server for the verification identification number and, in response to a press of the button, make a request to the server for the verification identification number.

3. The printing system according to claim 1, wherein the information for obtaining the print data to be printed includes information of a storage destination of the print data.

4. The printing system according to claim 1, wherein the verification identification number has an expiration date, and in a case where the expiration date of the verification identification number has passed, the one or more third controllers determine that verification of the verification identification number is unsuccessful.

5. The printing system according to claim 1, wherein the one or more third controllers further store information of the URL of the print data, the verification identification number, and an expiration date of the verification identification number in association with identification information of the print data.

6. The printing system according to claim 1, wherein the print code further includes identification information of the information processing apparatus, and the one or more second controllers further:

determine whether a verification-complete expiration date corresponding to the identification information of the information processing apparatus included in the read print code has passed;

determine whether a limited number of times for obtaining the print data to be printed from the server and printing the print data to be printed has been exceeded; and in a case where the verification-complete expiration date has not passed and the limited number of times has not been exceeded, skip processing for transmitting the verification identification number to the server.

7. The printing system according to claim 1, wherein the print code further includes identification information of the information processing apparatus, the one or more third controllers further:

in response to an inquiry for a verification status corresponding to the identification information of the information processing apparatus included in the print code from the image forming apparatus, determine whether a verification-complete expiration date corresponding to the identification information of the information processing apparatus included in the print code has passed;

determine whether a limited number of times of printing the print data to be printed has been exceeded; and in a case where the verification-complete expiration date has not passed and the limited number of times has not been exceeded, instruct the image forming apparatus to skip processing for transmitting the verification identification number to the server, and the one or more second controllers, in response to a skip instruction, skip display of the input screen for inputting the verification identification number and the processing for transmitting the verification identification number to the server.

8. The printing system according to claim 1, wherein the print code is a one-dimensional or two-dimensional barcode.

9. A method of controlling a printing system comprising an information processing apparatus, an image forming apparatus, and a server that provides a print service, making, for the information processing apparatus, a first request to the server for information for obtaining print data to be printed;

displaying, for the information processing apparatus, a first screen that includes a print code based on the information, which is obtained from the server in response to the first request on a display;

making, for the information processing apparatus, a second request to the server for a verification identification number of the print data to be printed;

in accordance with receiving the verification identification number from the server in response to the second request, displaying, for the information processing apparatus, a second screen, being separate from the first screen, including the verification identification number obtained from the server on the display;

reading, for the image forming apparatus, the print code displayed on the first screen of the information processing apparatus;

displaying, for the image forming apparatus, an input screen for inputting the verification identification number displayed on the second screen based on the read print code;

transmitting, for the image forming apparatus, information included in the print code and the verification identification number inputted via the input screen to the server;

transmitting, for the image forming apparatus, a data request to the server to obtain the print data to be printed from the server and printing the obtained print data to be printed in accordance with successfully verifying the verification identification number at the server;

transmitting, for the server, the information for obtaining the print data to be printed to the information processing apparatus in response to the first request for the information for obtaining the print data;

in response to the second request from the information processing apparatus, generating, for the server, the verification identification number of the print data to be printed and transmit the verification identification number of the print data to be printed to the information processing apparatus;

verifying, for the server, the verification identification number transmitted from the image forming apparatus; and upon successfully verifying the verification identification number, in response to the data request from the image forming apparatus, performing, for the server, control so as to transmit the print data to be printed to the image forming apparatus, wherein the print code includes Uniform Resource Locator, URL, of the print data and identification data of the print data, and wherein the verification identification number includes a password of a user that requests printing of the print data or a personal identification number of the user.

10. The method according to claim 9, wherein in displaying the first screen that includes the print code, displaying, for the information processing apparatus, a button for instructing a request to the server for the verification identification number and, in response to a press of the button, making, for the information processing apparatus, a request to the server for the verification identification number.

11. The method according to claim 9, wherein the information for obtaining the print data to be printed includes information of a storage destination of the print data.

12. The method according to claim 9, wherein the verification identification number has an expiration date, and in a case where the expiration date of the verification identification number has passed, in the verifying, for the server, determining that verification of the verification identification number is unsuccessful.

13. The method according to claim 9, further comprising, for the server, storing information of the URL of the print data, the verification identification number, and an expiration date of the verification identification number in association with identification information of the print data.

14. The method according to claim 9, wherein the print code further includes identification information of the information processing apparatus, and the method further comprising:

determining, for the image forming apparatus, whether a verification-complete expiration date corresponding to the identification information of the information processing apparatus included in the read print code has passed;

determining, for the image forming apparatus, whether a limited number of times for obtaining the print data to be printed from the server and printing the print data to be printed has been exceeded; and in a case where the verification-complete expiration date has not passed and the limited number of times has not been exceeded, skipping, for the image forming apparatus, processing for transmitting the verification identification number to the server.

15. The method according to claim 9, wherein the print code further includes identification information of the information processing apparatus, in response to an inquiry for a verification status corresponding to the identification information of the information processing apparatus included in the print code from the image forming apparatus, determining, for the server, whether a verification-complete expiration date corresponding to the identification information of the information processing apparatus included in the print code has passed;

determining, for the server, whether a limited number of times of printing the print data to be printed has been exceeded; and in a case where the verification-complete expiration date has not passed and the limited number of times has not been exceeded, instructing, for the server, the image forming apparatus to skip processing for transmitting the verification identification number to the server, and in response to a skip instruction, skipping, for the image forming apparatus, displaying of the input screen for inputting the verification identification number and the processing for transmitting the verification identification number to the server.

16. The method according to claim 9, wherein the print code is a one-dimensional or two-dimensional barcode.

* * * * *